Aug. 2, 1938.     W. M. NAJDER     2,125,392
IDENTIFICATION ATTACHMENT FOR VEHICLES
Filed Oct. 10, 1936
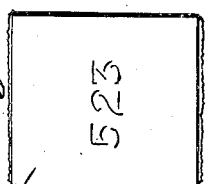
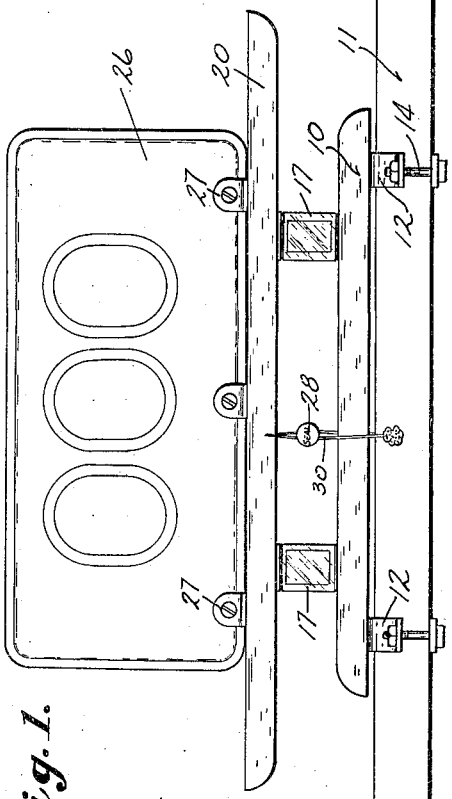
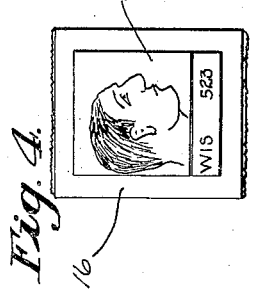
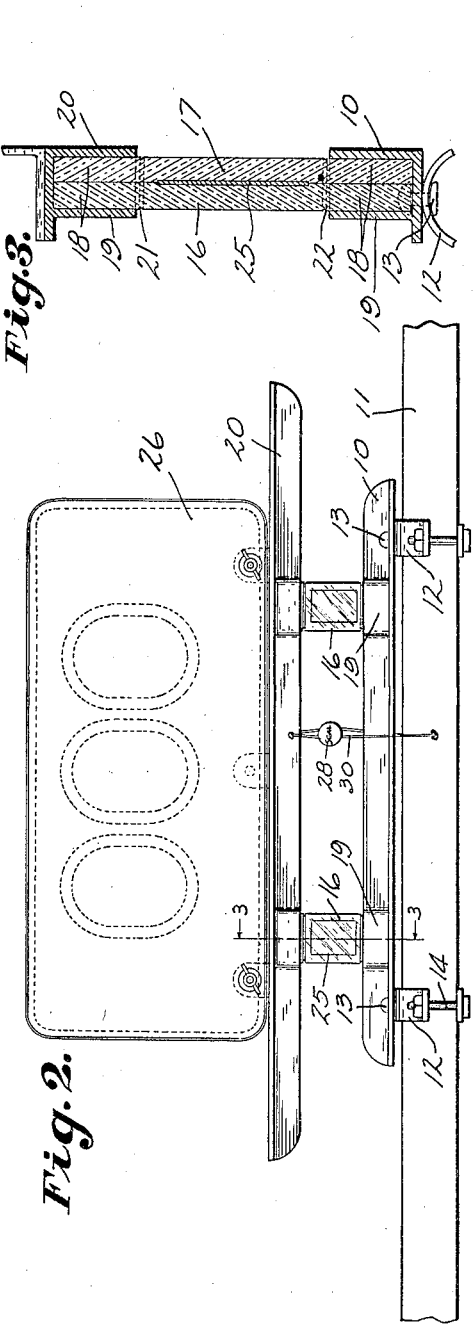
INVENTOR.
Walter M. Najder
BY Wheeler, Wheeler & Wheeler
ATTORNEYS Patented Aug. 2, 1938

2,125,392

UNITED STATES PATENT OFFICE 2,125,392

IDENTIFICATION ATTACHMENT FOR VEHICLES

Walter M. Najder, Milwaukee, Wis.

Application October 10, 1936, Serial No. 104,986

6 Claims. (Cl. 116—32)

My invention relates to improvements in identification attachments for vehicles.

A primary object is to provide means whereby a vehicle that has been subjected to a severe shock will not only deposit identifying articles or fragments in the vicinity where the shock occurs, but will do so in such a manner that the occupants of the vehicle will find great difficulty in wholly removing the means for identification.

A further primary object is to provide a vehicle with means for identifying not only the vehicle, but the owner thereof, whereby owners may be detected and apprehended after an accident, and whereby the drivers of stolen cars may be more readily apprehended than heretofore, and whereby a driver subject to suspicion may be either identified as owner or held pending investigation if driving a car not owned by him.

More specific objects are to provide means whereby identifying pictures, numerals, or other characters, in multiple or otherwise, may be held between frangible clamping plates connected with a vehicle and released when such plates are broken, the fragments of the plates and the devices normally clamped between them, being scattered when the plates are broken.

Also, to provide frangible clamping plates with lines of weakness whereby they may be broken under shocks of predetermined severity, and the means of identification effectively scattered even through the plates remain intact at all points other than said lines of weakness.

A further object is to provide improved holders for normally connecting frangible identification members with a vehicle.

In the drawing:—

Figure 1 is a face view of my improved identification attachment as it appears when used to support a license plate from the buffer bar of an automobile.

Figure 2 is a view of the same as seen from the opposite side.

Figure 3 is an enlarged sectional view drawn to line 3—3 of Figure 2.

Figure 4 is a detached view of one of the identifying or photographic characters partially secured to a fragment of a glass clamping plate.

Figure 5 is a view of a glass fragment carrying identifying numerals.

Like parts are identified by the same reference characters throughout the several views.

A supporting bar 10, preferably a socketed angle bar, may serve as a base for my attachment. It may be secured to a buffer bar 11 by suitable clamping brackets 12, rivets 13, and bolts 14. However, the base, the part of the vehicle to which it is attached, and the means for securing it to the vehicle, are not essential.

Holding plates 16 and 17, preferably of glass or other frangible material, have projections 18 along their lower margins which enter the sockets of the bar 10, and the upper margins of the plates have similar projections socketed in an inverted bar 20. The socketed portions 19 of the holders may be channel-shaped as shown in Figure 3.

The intermediate portions of the plates are connected with the engaged upper and lower marginal projections by relatively weak zones or neck portions 21 and 22. The glass plates may be weakened along zones 21 and 22 by constriction, perforation, or otherwise. Between the plates I embed identification members, such as pictures 25 or number plates, or both. The plates may be slightly recessed to receive these members, as indicated in Figure 3, although this is not essential. One or more photographs of the car owner may be used, as indicated in Figure 4. The numerals may appear on number plates or they may be embossed upon or embedded integrally within the plates in a casting operation.

The photographs may be in multiple, and in addition thereto small plates or cards bearing identifying numerals or characters, as shown in Figure 4, may be normally held between the plates and released when the plates are broken from their supports. Also, if desired, the intermediate portions of the plates 16 and 17 may have embedded therein like identifying numerals or characters, as indicated in Figure 5.

If desired, the vehicle license plates 26 may be bolted to upstanding ears 27 carried by the upper holding bar 20, as best shown in Figure 1, although it is, of course, not essential that the license plates should be associated with my improved identifying attachment.

If desired, the authorities issuing license plates may combine them with my improved attachment and may require the owner of the car to furnish photographs for the purpose above described, said photographs and the identifying numerals being officially placed between the plates 16 and 17 and the plates permanently secured or cemented in the holding bar channels. For greater security the photographs and other identifying characters may also be cemented to the glass plates, thus making it difficult, if not impossible, for any user of a car to make fraudulent substitutions.

Also, for additional security, an official seal 28 may be applied to the upper holding bar 20 and connected by a link 30 extending through the lower holding bar and through an aperture in the buffer bar 11, as shown in Figure 1. The linkage 30 may be also sealed where it extends through the buffer bar or through any other portion of the vehicle, whereby if the link is removed the fact of removal or replacement will be difficult to conceal by any counterfeit substitutions.

It will be understood that in the event of an accident to a vehicle equipped with my attachment, if the glass plates 16 and 17 are broken, the pictures of the owner will be released, and the plates carrying other identifying characters clamped between said plates will also be released. Fragments of the plates will be scattered over the roadway, and it will be practically impossible for the driver of the car to gather up all of the identifying pieces or characters, particularly if the person attempting to do so is desirous of quickly escaping from the scene of the accident.

I claim:

1. An identification attachment for vehicles comprising a set of post-like paired frangible plates having identifying characters clamped between them, and a set of holders, one adapted to be attached to a motor driven vehicle and marginally engaging said plates, and the other holder being supported from the first mentioned holder by said plates in a position for utilization of its inertia to break the plates from said first holder under a degree of shock predetermined by the frangibility of the marginal portions of the plates adjacent their connection with the holders.

2. An identification attachment for a vehicle comprising a pair of oppositely disposed elongated holders having channel-shaped portions, a set of glass plates arranged in pairs to form flat supporting posts for one of the holders, said plates being marginally engaged in the channels of said holders at opposite sides of their central portions and provided with zones of weakness partially separating the marginal from the intermediate portions, and multiple identifying characters clamped between said plates.

3. An identification attachment for a vehicle comprising a pair of oppositely disposed spaced channel-shaped holders, a set of paired glass plates supporting one of the holders at opposite sides of its central portion and marginally engaged in the channels of said holders and provided with zones of weakness partially separating the marginal from the intermediate portions, and multiple identifying characters clamped between said plates, said plates also having like identifying characters embedded in material of which the plates are composed.

4. In an identification attachment for vehicles, the combination with a suitable holder, of a set of spaced frangible pairs of supporting plate-like posts, each socketed in the holder, a plate breaking inertia member supported by said posts, and identification devices normally clamped between the plates of each post and adapted to be released when the plates are broken from the holder and the inertia member.

5. In an identification attachment for vehicles, the combination with a suitable holder, of a plurality of pairs of plates mounted upon the holder, identifying characters normally mounted between the plates of each pair, and an inertia bar normally connecting the upper margins of the pairs of plates and wholly supported thereby, said plates adjacent the holder and the inertia bar being relatively frangible as compared with the other portions of the plates and adapted to predetermine the degree of shock required to break the plates from the holder.

6. In an identification attachment for vehicles, the combination with a suitable support, of sets of paired glass plates, relatively narrow with reference to the support, and connected with the support by relatively frangible neck portions, an inertia bar supported by said plates and similarly connected therewith by frangible neck portions, and identification devices normally supported between the plates and adapted to be released when the plates are released from each other by fracture of the relatively frangible neck portions.

WALTER M. NAJDER.